United States Patent [19]

Carter

[11] 4,245,863
[45] Jan. 20, 1981

[54] PROTECTIVE INSERT FOR THE SIDES OF LOAD CARRYING VEHICLES

[76] Inventor: David T. Carter, 3303 SE. 167th Ave., Portland, Oreg. 97236

[21] Appl. No.: 9,221

[22] Filed: Feb. 2, 1979

[51] Int. Cl.³ .............................................. B62D 33/02
[52] U.S. Cl. .............................. 296/39 R; 52/DIG. 4; 52/DIG. 12; 105/423
[58] Field of Search ........................... 296/39 R, 39 A; 52/DIG. 4, DIG. 12; 105/423; 293/128

[56] References Cited

U.S. PATENT DOCUMENTS

| | | | |
|---|---|---|---|
| D. 224,219 | 7/1972 | Ritter | D12/93 |
| 2,898,146 | 8/1959 | Yudenfreund | 296/39 R |
| 3,147,176 | 9/1964 | Haslam | 49/460 |
| 3,669,817 | 6/1972 | McDevitt | 49/460 |
| 3,881,768 | 5/1975 | Nix | 296/39 R |
| 3,942,239 | 3/1976 | Johansson | 105/423 |
| 4,029,354 | 6/1977 | Valeri | 296/39 R |
| 4,127,274 | 11/1978 | Cooper | 293/128 |
| 4,162,098 | 7/1979 | Richardson | 296/39 R |

Primary Examiner—Robert R. Song
Attorney, Agent, or Firm—Eugene M. Eckelman

[57] ABSTRACT

An elongated plate-like body portion is arranged to stand on its bottom edge on the floor panel of a vehicular load carrying area and be releasably secured to the inner surface of the metallic side panel of the load carrying area. Releasable securement of the body portion to the side panel comprises an adhering surface portion integral with the body portion and of a type arranged to adhere releasably to the side panel. Such adhering surface portion may comprise magnetic strip material, Velcro or the like. The body portion has one or more hand holes for ease in handling and a bottom recess to fit over wheel wells. Such body portion has a lightweight but tough construction to protect the side panels of the load carrying area from load damage.

5 Claims, 4 Drawing Figures

U.S. Patent  Jan. 20, 1981  4,245,863
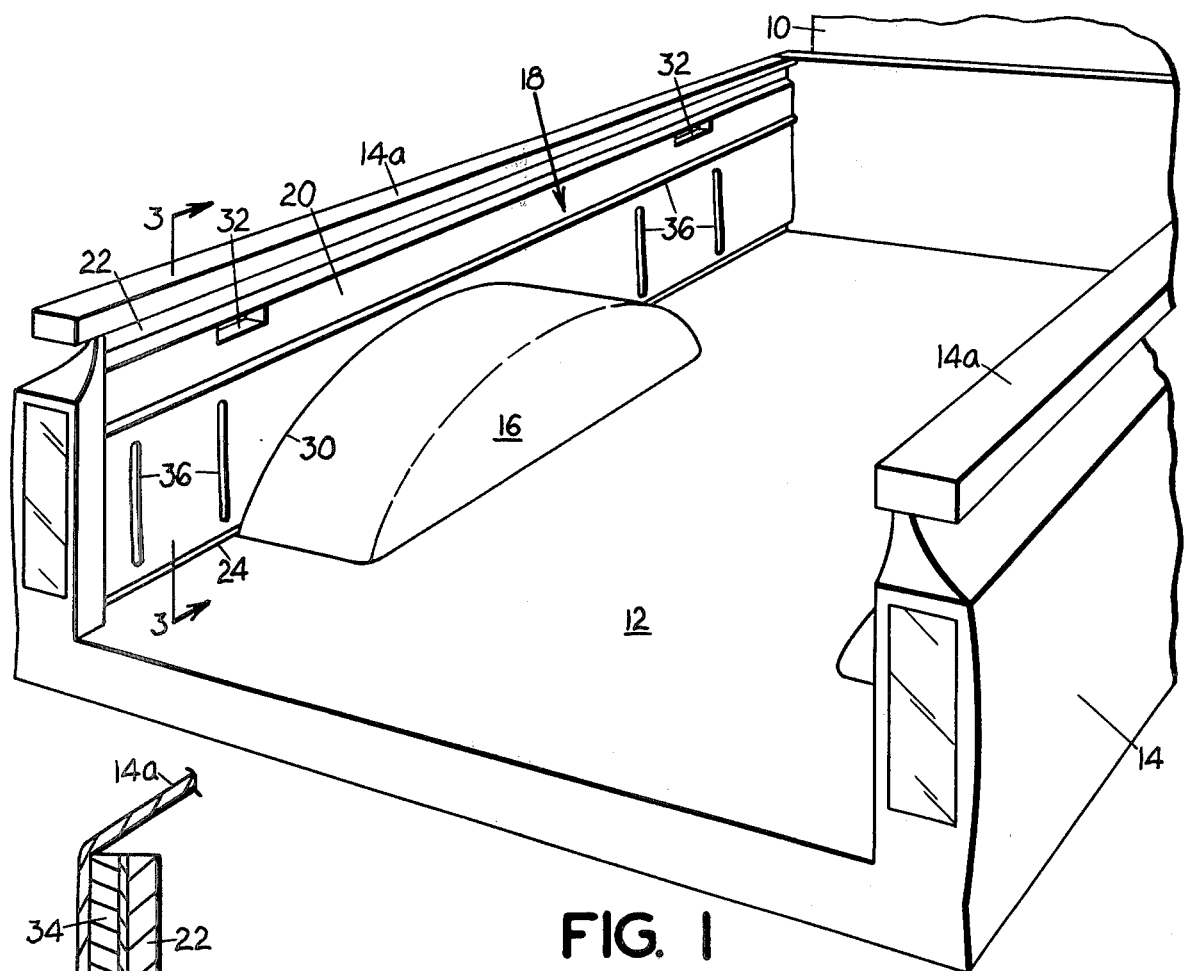
FIG. 1
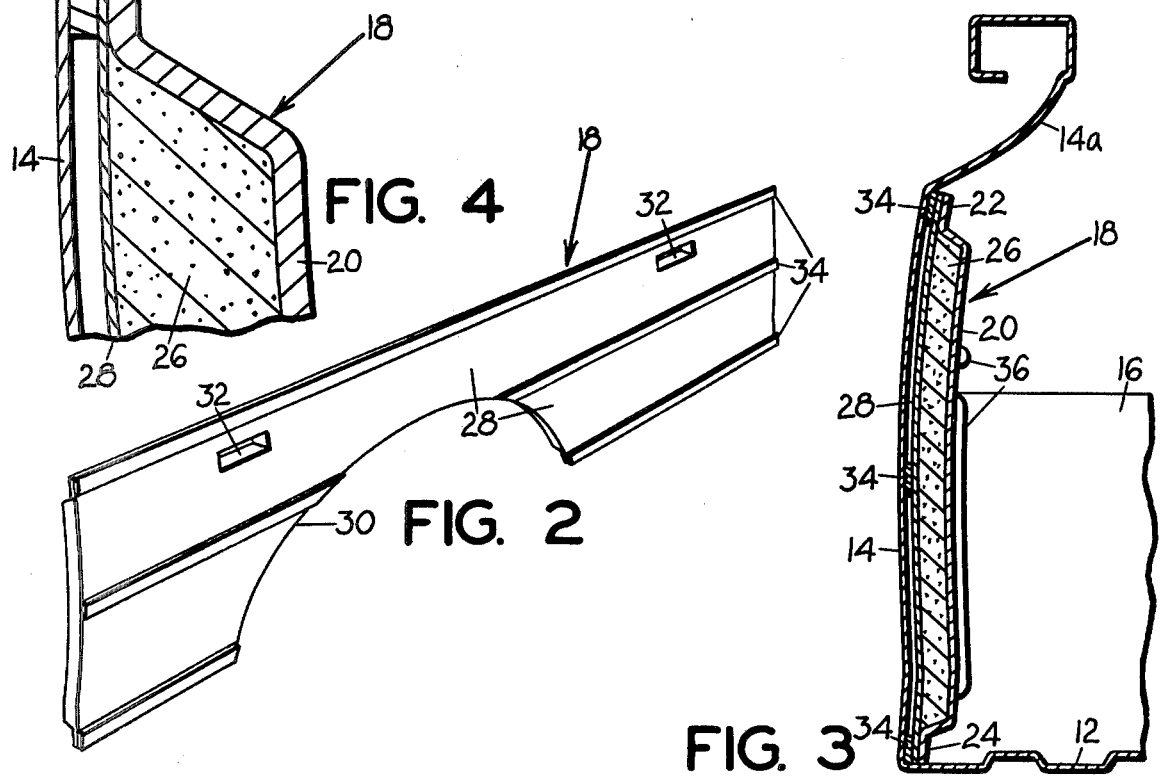
FIG. 4
FIG. 2
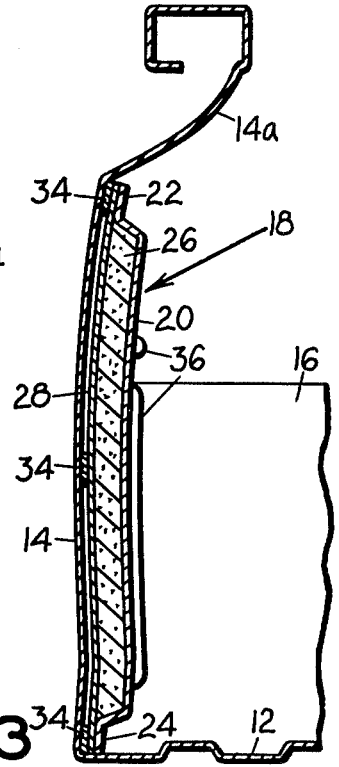
FIG. 3

PROTECTIVE INSERT FOR THE SIDES OF LOAD CARRYING VEHICLES

BACKGROUND OF THE INVENTION

This invention relates to new and useful improvements in protective devices for vehicular load carrying areas.

Devices have heretofore been used to protect the side panels of load carrying vehicles, such as pickups or vans, from load damage. These devices comprise inner boxes, floor plates, and the like, most of which are of heavy construction and difficult to handle. Applicant is of the opinion that the majority of pickup and van owners are not particularly concerned about wear to the floor of the load carrying area but are seriously concerned about wear or damage to the side panels, particularly on those vehicles that do not employ double wall construction of the side panels. It is considered that previous protective devices for such load carrying areas have not met with commercial success because of their complexity, bulkiness, and other factors; for example, they are not readily installed and removed for convenience and they do not mount compactly in place so as to take up a minimum of space in the load carrying area.

SUMMARY OF THE INVENTION

According to the present invention and forming a primary objective thereof, a protective insert is provided for the sides of a vehicular load carrying area which is simple in construction, light in weight but at the same time rugged in construction, easy to handle, readily installed and removed, and mountable compactly in place so as to take up a minimum of space in the load carrying area.

The objectives of the invention are accomplished by a structure employing an elongated plate-like body portion arranged to stand on edge on the floor panel of a load carrying area and having means thereon arranged to conveniently and releasably secure said body portion to the side panel of the load carrying area. Such securing means comprises an adhering surface, such as magnetic strip means or Velcro, integral with said body portion and arranged for releasable securement to the side panel. The body portion comprises a lightweight but tough and durable structure and is suitably shaped and sized to fit compactly up against the side panel of the load carrying area.

The invention will be better understood and additional objects and advantages will become apparent from the following description taken in connection with the accompanying drawings.

IN THE DRAWINGS

FIG. 1 is a rear perspective view of the present insert as installed in a pickup truck;

FIG. 2 is a perspective view of the opposite or back side of the insert from that shown in FIG. 1;

FIG. 3 is an enlarged sectional view taken on the line 3—3 of FIG. 1; and

FIG. 4 is a fragmentary sectional view similar to FIG. 3 but being substantially enlarged to better show details.

DETAILED DESCRIPTION OF PREFERRED EMBODIMENTS

With particular reference to the drawings and first to FIG. 1, the present protective insert for the sides of a vehicular load carrying area is shown installed in a pickup truck type of load carrying vehicle 10. This type of vehicle has a rear box including a floor panel 12 and side panels 14, FIGS. 3 and 4, having a top horizontal flange 14a. Wheel wells 16 generally project up from the floor panel.

The insert comprises a plate-like body portion 18 constructed so as to be light in weight, tough, durable, and capable of withstanding blows from a load and preventing effects of such blows from damaging the side panels. To accomplish these multiple functions, the body portion is preferably constructed of a cup-shaped or recessed body member 20 of tough plastic or the like. This body member has top and bottom flanges 22 and 24, respectively, and its recessed portion is provided with a core or filling 26 of lightweight packing-like material such as expanded plastic, foam rubber, or other compressible material. The other side of the insert has a tough skin 28 secured thereon such as plastic membrane.

The insert 18 is shaped and sized to fit up against the inner side of a side panel 14 of the vehicle, as best seen in FIG. 3, and for this purpose it will generally be required to have a recess 30 in its bottom edge to fit over the wheel well 16. In the use of the insert with pickup trucks it is sized to preferably fit up to or close to the bottom of top flange 14a. Furthermore, the outer surface of the body portion 18 may be contoured so as to conform to the shape of the inner surface of said side panel 14 with its outer surface lying substantially in abutment against the inner surface of the side panel.

One or more hand grip holes 32 are provided at an upper portion of the inserts for easy handling.

The inserts include structure for convenient releasable attachment to the vehicle. Such structure comprises adhering means disposed on the outer side thereof and of a type capable of providing repeated attachment and detachment. Such adhering means may for example comprise a magnetic tape 34 of well known construction secured permanently to the outer surface of the insert over the skin 28 and magnetically attachable to the inner surface of the metallic side panel of the vehicle. The tape 34 can comprise a continuous strip along the upper and lower portions of the insert. Such tape may or may not extend around the wheel well recess 30. A strip of the securing tape 34 may also extend longitudinally at a point intermediate the top and bottom and could be the sole means of connection or it could be used in addition to one or both of a top and bottom strip. The tape 34 could as well be secured on the inserts by locating spaced patches therealong if desired rather than using the long strips. However, full length strips are preferred particularly at the top and bottom, to prevent foreign objects from lodging between the insert and the side panel of the vehicle. The adhering means 34 may also comprise a Velcro connection wherein one or more strips or patches of one portion of a filamentary loop or hook material has releasable connection to strips or patches of the other loop or hook material. One element of these cooperating strips or patches is in this case secured to the outer side of the insert and the other element is secured to the inner face of the side panel 14 of the vehicle.

Body member 20 may be provided with reinforcing ribs 36 which extend horizontally vertically as necessary.

According to the invention, a protective insert is provided that is light in weight, inexpensive to manufacture, easy to handle and install and remove, and of a structure providing good protection of the side panels of load carrying vehicles. It has particular use with pickup trucks having single panel wall structures, although it can be adapted to other types of pickups as well as to vans. An insert embodying features of the invention and suitably shaped and sized could also be attached to the front wall of the truck bed to protect such wall. Since the present insert fits directly up against walls of the vehicle load area, it takes up a minimum of load space. Also, since the inner facing portion of the insert has no hard cover, any solid foreign matter that may accidentally lodge between the insert and the wall panel will sink into the soft core 26 rather than damage the vehicle.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the insert can be constructed in an extruded-like length and cut to fit the desired work load area.

Having thus described my invention, I claim:

1. A protective insert for the vertical inner sides of a vehicular load carrying area of the type having metallic side panels, a floor panel, and wheel wells projecting up from the floor panel, said insert comprising
   (a) an outer substantially rigid cup-shaped body portion arranged to stand on edge on a floor panel of a vehicle with the cupped portion thereof facing a side panel of the vehicle,
   (b) said body portion having an inner face arranged to face the load carrying area,
   (c) a core of compressible, shock-absorbing material mounted in the cupped area of said body portion,
   (d) said core having an outer face with a contour substantially similar to the contour of a side panel of a vehicle,
   (e) and securing means arranged to secure said body portion to a vertical panel of a vehicular load carrying area.

2. The protective insert of claim 1 including a thin, flexible membrane secured over said outer face of said core.

3. The protective insert of claim 1 wherein said securing means comprises magnet means on the cupped side of said body portion, said magnet means providing a releasable attachment of said insert to a vehicle.

4. The protective insert of claim 1 wherein said securing means comprises strips of cooperating filamentary loops and hooks, one of said strips being secured to the outer face of said body portion and the other of said strips being arranged to be secured to a side panel of a vehicle.

5. The protective insert of claim 1 wherein said body portion includes at least one hand hole at an upper portion thereof and a recess at a lower portion thereof arranged to fit over an upwardly projecting wheel well of a vehicle.

* * * * *